Dec. 8, 1970  HIROSUKE FURUSHO  3,545,300
COLLAPSIBLE STEERING COLUMN FOR VEHICLES
Filed Jan. 31, 1969  3 Sheets-Sheet 1

INVENTOR.
Hirosuke Furusho
BY
Pierce, Scheffler & Parker
Attorneys

United States Patent Office 3,545,300
Patented Dec. 8, 1970

3,545,300
COLLAPSIBLE STEERING COLUMN FOR VEHICLES
Hirosuke Furusho, Takarazuka-shi, Japan, assignor to Daihatsu Kogyo Co. Ltd., Osaka, Japan, a corporation of Japan
Filed Jan. 31, 1969, Ser. No. 795,444
Claims priority, application Japan, Feb. 15, 1968, 43/9,718
Int. Cl. B62d 1/18
U.S. Cl. 74—492
4 Claims

ABSTRACT OF THE DISCLOSURE

A collapsible steering column assembly for a vehicle includes a collapsible member in the form of an energy absorbing plastic tube which can be made of lead, zinc, copper or aluminum. The tube yields structurally in an axial direction upon impact and in a controlled manner.

---

This invention relates to vehicle steering column assemblies and more particularly to collapsible steering column assemblies for vehicles.

An abject of the invention is to provide an improved collapsible steering column assembly.

Another object is to provide a simple energy absorbing means which occupies rather small space even after yielding structurally.

Still another object is to provide an energy absorbing means which is manufactured and remanufactured easily.

These and other features and advantages of the invention will be readily apparent from the following specification and the drawing wherein.

Figure 1:
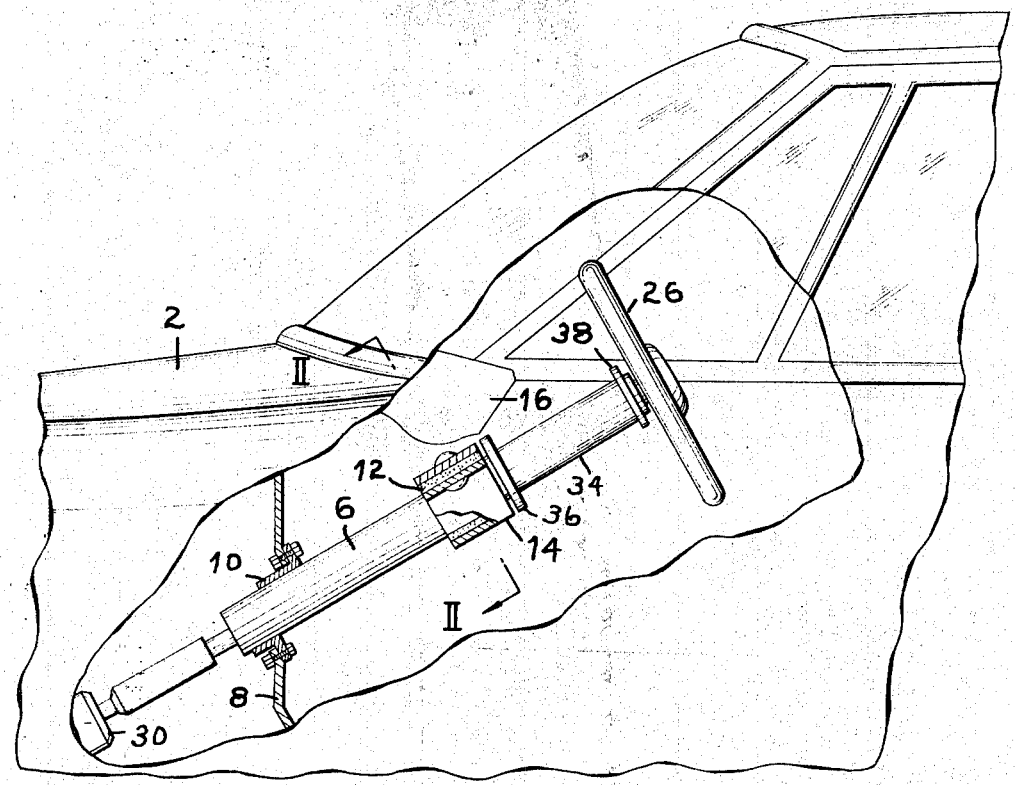
FIG. 1 is a fragmentary plan view of a motor vehicle incorporating a steering assembly to which the invention is applied.
Figure 2:
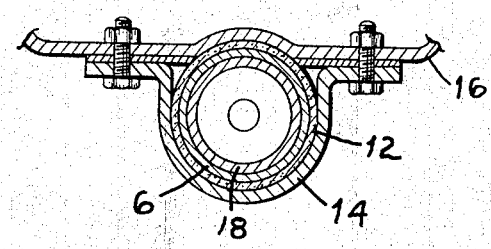
FIG. 2 is an enlarged section view taken generally along the plane indicated by line II—II of FIG. 1.

Referring to FIG. 1, and FIG. 2, the reference numeral 2 generally designates a vehicle body, a portion of which is broken away to reveal a steering assembly which includes a nonrotatable intermediate lower column 6 fixed to the vehicle fire wall 8 at its lower end by a flange mount 10, and at its upper end, supported by a low friction bushing 12 mounted in a housing 14 mounted on the lower surface of the vehicle instrument panel 16. Axially aligned with column 6 and telescopingly movable relative thereto is upper column 18. This upper column 18 is secured with the lower column 6 by a shear pin 20 shown in FIG. 3.

Figure 3:
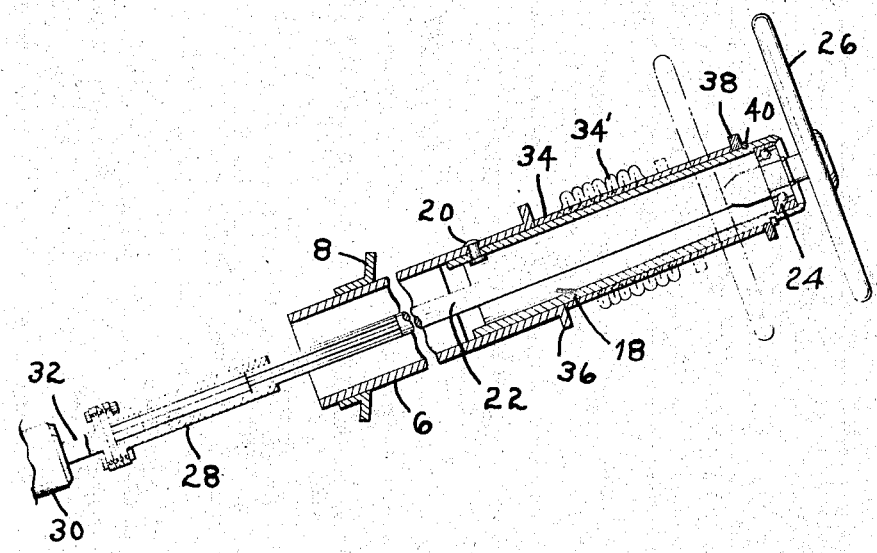
FIGS. 3 through 6 are sectional elevation views illustrating the details of different embodiments in accordance with the invention.

Referring to FIG. 3, an upper steering shaft 22 is supported at the bore of the upper column 18 by a thrust ball bearing 24 and is connected at its upper end to a conventional steering wheel 26, and at its lower end to a hub 28 having inner splines, said hub 28 being connected to a gear box 30 through a shaft 32.

In FIG. 3, the reference numeral 34 designates a tubular plastic member interposed between an outwardly extending flange 36 formed at the upper end of the lower column 6, and a stopper ring 38 maintained by a thrust ring 40 on the upper end of the column 18. The tubular plastic member 34 is inserted on the upper column 18 in the manner that the member 34 and the outer surface of the upper column 18 keep a relatively close contact with each other, and the said member 34 is made of lead. The said member 34 may also be made of one of the group consisting of zinc, copper and aluminum.

In accordance with the features of the embodiment shown in FIG. 3, in the event of vehicle impact with an obstacle which would cause the vehicle operator to hit the steering wheel 26 downward and cause the steering wheel 26 to be displaced downward relative to the lower column 6, the force given to the steering wheel 26 downward is transmitted in turn to the member 34, through the thrustbearing 24, the upper end of the column 18, the thrust ring 40, and the stopper ring 38. When the downward operating force on the column 18 relative to the column 6 reaches to a predetermined amount, the shear pin 20 is sheared and permits the member 34 to start to collapse to absorb the impact, deforming the member 34 to the collapsed shape shown in the broken line 34' in FIG. 3.

Deformation of the plastic tube 34 is controlled by progressive flow of the plastic material throughout essentially the entire length of the tube and the friction which exists between the inner wall of tube 34 and the outer wall of column 18.

Figure 4:
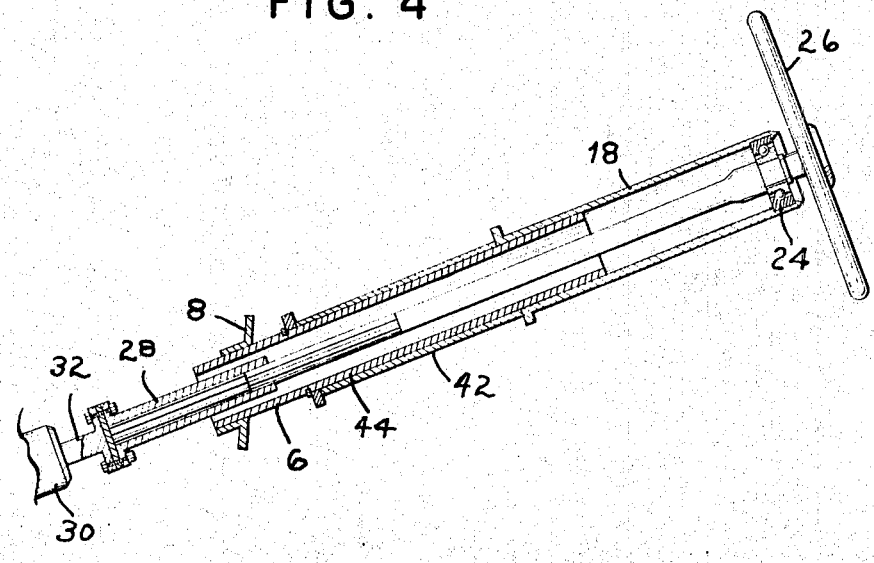

In a modified construction according to FIG. 4, a tubular plastic member 42 is inserted on the lower column 44, the structure, shape and the operation of which is similar to the member 34 shown in FIG. 3.

Figure 5:
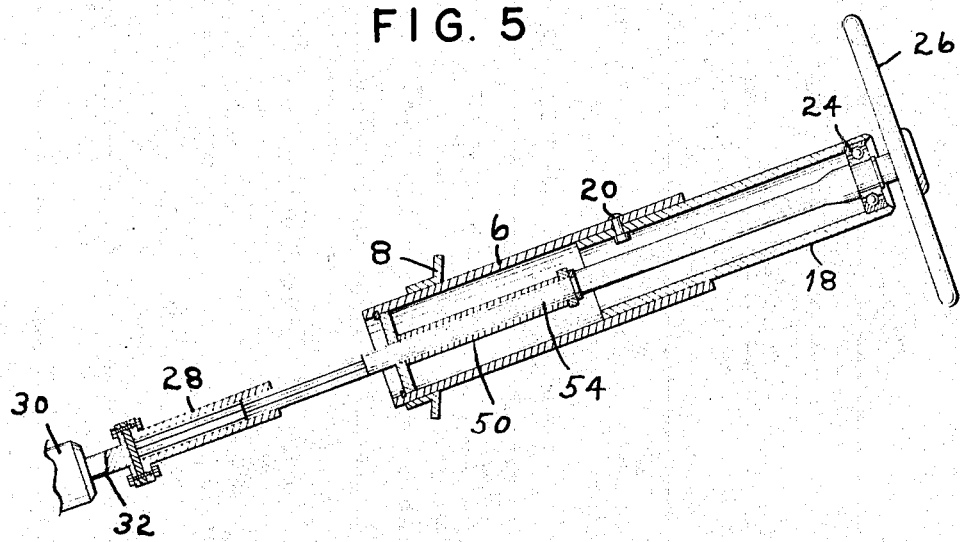
Figure 6:
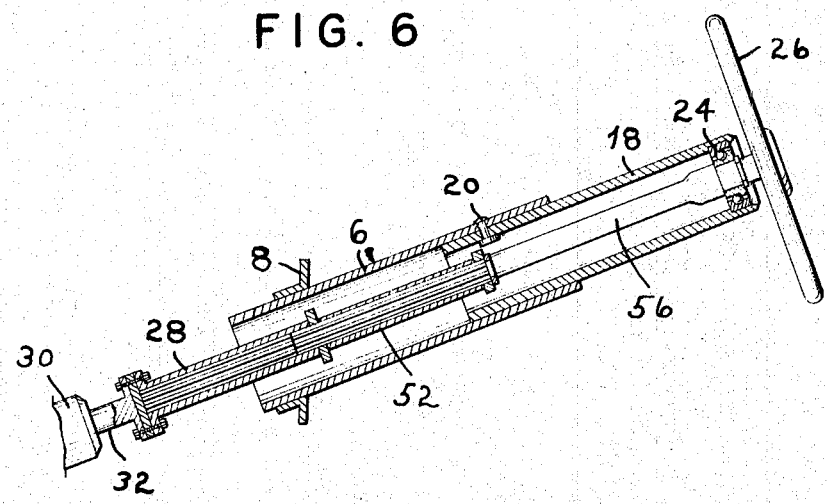

In FIG. 5 and FIG. 6, the tubular plastic members 50 and 52 are inserted on the upper steering shaft 54 and 56 respectively, the operation of which is the same with that of the member 34 shown in FIG. 3. In the embodiment of this invention shown in FIG. 6, the member 52 can absorb the impact force not only from the steering wheel 26 but also from the gear box 30.

In accordance with this invention, when absorbing impact energy, the tubular plastic member collapses into a predetermined relatively slim shape in diameter according to its material, and shape.

What is claimed is:

1. In a steering assembly for a vehicle having a rotatable steering element fixed to and extending from a steering wheel to a splined connection with a gear box at the lower end thereof and a non-rotatable tubular column spaced radially from the steering element and composed of two telescoping elements, the column being fixed at its lower end to a portion of the vehicle and the upper end thereof being provided with means for rotatably mounting the upper end of the steering element therein, the improvement comprising a deformable metal sleeve mounted about one of said steering element and said two telescoping elements, and means provided on at least one of said elements for collapsing said deformable metal sleeve when the tubular column and splined connection are telescoped together upon longitudinal impact, said sleeve affording resistance while being collapsed in a controlled manner and while sliding frictional resistance is obtained with the element on which it is mounted.

2. In a steering assembly as claimed in claim 1 wherein the deformable metal sleeve comprises a metal selected from the group consisting of lead, zinc, copper and aluminum.

3. In a steering assembly as claimed in claim 1 wherein said sleeve is mounted on one of said two telescoping elements of said tubular column.

4. In a steering assembly as claimed in claim 1 wherein said sleeve is mounted on said steering element.

References Cited

UNITED STATES PATENTS

| | | | |
|---|---|---|---|
| 3,262,332 | 7/1966 | Wight | 74—493 |
| 3,373,630 | 3/1968 | Heurtebise | 74—492 |
| 3,401,576 | 9/1968 | Eckels | 74—493 |
| 3,457,800 | 7/1969 | Toshida et al. | 74—492 |
| 3,470,761 | 10/1969 | Okamoto et al. | 74—492 |

MILTON KAUFMAN, Primary Examiner